Figure 1:
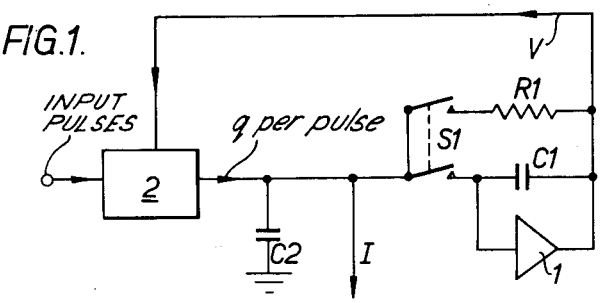

Nov. 23, 1965  E. H. COOKE-YARBOROUGH  3,219,940
RATEMETERS FOR ELECTRICAL PULSES
Filed March 22, 1963

United States Patent Office 3,219,940
Patented Nov. 23, 1965

3,219,940
RATEMETERS FOR ELECTRICAL PULSES
Edmund Harry Cooke-Yarborough, Longworth, near Abingdon, England, assignor to United Kingdom Atomic Energy Authority, London, England
Filed Mar. 22, 1963, Ser. No. 267,232
Claims priority, application Great Britain, Mar. 29, 1962, 12,196/62
2 Claims. (Cl. 328—140)

This invention relates to ratemeters for electrical pulses.

In the specification of my U.S. Patent No. 3,056,047 there is described a ratemeter in which the input pulses are fed to a storage capacitor while a current corresponding to the average rate of flow of charge into the capacitor at a given input pulse rate (the tolerance rate), irrespective of the actual input pulse rate, is drawn from the capacitor. Prior to a count the capacitor voltage is set to an initial value, and two detection circuits are provided to indicate when the capacitor voltage has changed, in either direction, to predetermined levels.

It has been shown that the discriminating power of such a ratemeter for unknown random rates is independent of an accompanying background rate provided the difference between the two predetermined levels is made proportional to the total counting rate, i.e., including the background, at the tolerance level. This is equivalent to making the charge per pulse $q$ fed to the storage capacitor vary inversely as the sum of the count-rate due to the given level and the count-rate due to the background, i.e., if the tolerance count-rate is $\lambda_a$ and the background count-rate $\lambda_b$, and if in the absence of background the charge per pulse is $q_0$, then for constant discriminating power $$q = q_0 \frac{\lambda_a}{\lambda_a + \lambda_b} \quad (1)$$

It is an object of the present invention to provide a ratemeter circuit in which the charge per pulse varies in this way.

According to the present invention, in a ratemeter as aforesaid there is provided means temporarily connectable to said storage capacitor prior to making a count for obtaining a voltage proportional to the difference between the current corresponding to the given count-rate and the mean current due to the background pulses, said voltage being fed back to means for making the charge per background pulse fed to the storage capacitor proportional to said voltage, and means for maintaining the charge per pulse at the value thus attained during the subsequent count.

Also in accordance with the present invention, in a ratemeter circuit as aforesaid there is provided a virtual-earth amplifier including a feedback capacitor connected between input and output, switch means operable prior to making a count for connecting the amplifier input to that side of the storage capacitor whereof the voltage changes as the charge thereon changes and for connecting a resistor between the amplifier output and the input side of the storage capacitor, whereby the amplifier output voltage will attain a value dependent on the difference between the given and background count-rates, and a feedback connection from the amplifier output to a charge generator adapted to make the charge per background pulse fed to the storage capacitor proportional to said output voltage, said switch means being operable thereafter to disconnect the storage capacitor from the amplifier input and to open-circuit the resistor so that the feedback capacitor retains its charge and the charge per pulse fed to the storage capacitor during the subsequent count will remain at the attained value.

Where the storage capacitor is itself connected as the feedback capacitor of a Miller-type circuit, the switchable connection is made between the amplifier input and the output side of the storage capacitor and includes an inverter stage.

Figure 2:
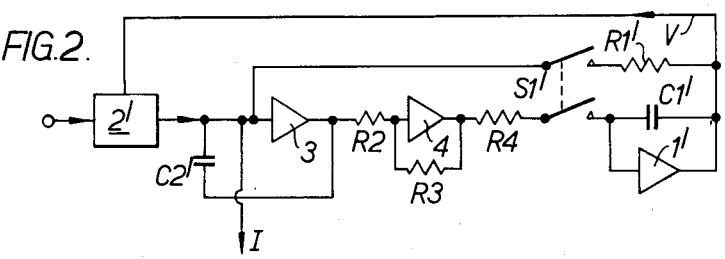
Figure 3:
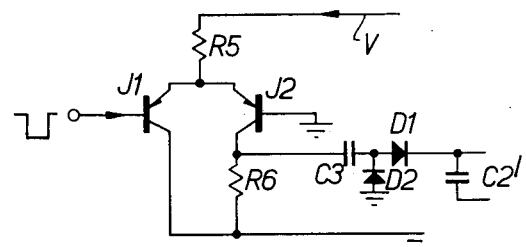
Figure 4:
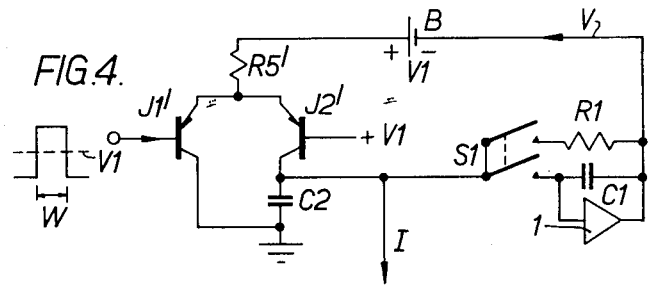

To enable the nature of the present invention to be more readily understood, attention is directed, by way of example, to the accompanying drawings wherein FIGS. 1 and 2 are simplified circuit diagrams of two embodiments of the invention, FIGS. 3 and 4 are circuit diagrams of charge generators suitable for use in the embodiments of FIGS. 2 and 1 respectively.

In FIG. 1 the specification of U.S. Patent No. 3,056,047 the storage capacitor C is short-circuited to earth through a switch S between measurements. In the embodiment of the present ratemeter shown in FIG. 1 of the accompanying drawings, the storage capacitor C2 is connected instead, via switch S1, to the virtual-earth input of a feed-back D.C. amplifier 1. The feedback circuit consists of a resistor R1 shunted by a capacitor C1, the time-constant $C1 \times R$ being made long enough to average-out statistical fluctuations in $\lambda_b$. It is assumed that the interval between successive measurements is long enough for a sufficiently accurate estimate of $\lambda_b$ to be made.

The current $I$ being withdrawn from the capacitor C2 is (by definition) $q_0\lambda_a$. The current fed in by the charge generator 2 is $q\lambda_b$ when background alone is present. To maintain equilibrium in the latter case the current flowing in through the feedback resistor R1 of the D.C. amplifier 1 is $$q_0\lambda_a - q\lambda_b$$
$$= q_0\lambda_a - q_0 \frac{\lambda_a\lambda_b}{\lambda_a + \lambda_b}$$
$$= q_0\lambda_a \left(1 - \frac{\lambda_b}{\lambda_a + \lambda_b}\right) \quad \text{(from Equation 1)}$$
$$= q_0\lambda_a \left(\frac{\lambda_a}{\lambda_a + \lambda_b}\right)$$

Thus the voltage $V$ at the output of the D.C. amplifier is $$R1 \times q_0 \times \lambda_a \left(\frac{\lambda_a}{\lambda_a + \lambda_b}\right)$$

This voltage is fed back to control the charge generator 2, the circuit constants being chosen so that $$q = \frac{V}{R1 \times \lambda_a}$$

The required relationship $$q = q_0 \frac{\lambda_a}{\lambda_a + \lambda_b}$$

is thus obtained.

Before starting the measurement, S1 is operated to disconnect the D.C. amplifier 1 with its feedback circuit from the storage capacitor C2 and to disconnect the feedback resistor R1 from both amplifier 1 and capacitor C2, so that the feedback capacitor C1 keeps the amplifier output V, and hence the value of $q$, constant for the duration of the measurement.

The method of detecting and indicating when the voltage across the capacitor C2 has changed, in either sense, to the predetermined levels is the same as in the ratemeter described in the above-mentioned U.S. patent.

With the above-described arrangement the probability of an error is independent of background rate and the average time for a test is inversely proportional to the sum of background and tolerance rates.

It will be apparent that since the voltage $V$ remains stored on the feedback capacitor C1, a number of successive counts can be made without reconnecting S1 to reset V between the counts.

As in FIG. 3 of the above mentioned U.S. patent, the storage capacitor C2 may itself be connected as the feedback capacitor of a Miller-type circuit. FIG. 2 of the accompanying drawings shows such an embodiment. In this case the background correction amplifier 1' is required to keep the *output* of the Miller amplifier 3 near zero prior to making a count. Since there is a phase inversion between the input and output of the Miller amplifier, a further inverter stage comprising amplifier 4 and resistors R2 and R3 is required. The output voltage of amplifier 4 is applied to amplifier 1' via a resistor R4.

Various forms of charge generator 2 may be used. FIG. 3 shows a circuit suitable for use where the input side of the storage capacitor C2' is a virtual-earth point, as in the embodiment of FIG. 2. In FIG. 3 each input pulse brings on J1 and cuts off J2, which is normally conducting. Since J2 base is at earth potential the voltage change at J2 collector is $$\frac{V}{R5} \times R6$$

The charge per pulse fed to C2' via the feed capacitor C3 and diode pump D1, D2 is thus $$\frac{V}{R5} \times R6 \times C3$$

The required relationship is therefore obtained by making $$\frac{R6 \times C3}{R5} = \frac{1}{R1 \times \lambda_a}$$

FIG. 4 shows a charge generator for use where the input side of the storage capacitor C2 is not a virtual-earth point, as in the embodiment of FIG. 1. In FIG. 4 the voltage $+V1$, to which J2' base is connected, is made more positive than the largest positive excursion of the voltage on C2 so that J2' collector does not bottom. To make the voltage across R5' zero when V is zero, a voltage equal to V1 is applied, as indicated for simplicity by battery B connected in series with V. In this circuit J1' base is normally biassed to a voltage more negative than V1, so that J1' conducts and J2' is cut off. Positive input pulses of defined width $w$ bring J2' into conduction, thus feeding charge to C2. In this case the current in R5' is $V/R5'$, and the charge per pulse thus $Vw/R5'$. The required relationship is therefore obtained by making $$\frac{w}{R5'} = \frac{1}{R1 \times \lambda_a}$$

J2' is chosen to have a very low collector leakage current.

I claim:

1. A ratemeter for electrical pulses comprising an electronic integrating circuit having a storage capacitor for charging by said pulses, means for discharging said capacitor at a constant rate independent of the rate at which pulses are fed to said capacitor, means temporarily connectable to said storage capacitor prior to making a count for obtaining a voltage proportional to the difference between the current corresponding to a given count-rate and the mean current due to background pulses, means for making the charge per background pulse fed to the storage capacitor proportional to said voltage, means for establishing an initial voltage across said capacitor, and means for detecting and indicating when the voltage across the capacitor has changed, in either direction, from said initial voltage to predetermined levels.

2. A ratemeter circuit for electrical pulses comprising a Miller-type electronic integrating circuit having a feedback loop including a storage capacitor for charging by said pulses, means connected to said capacitor for discharging said capacitor at a constant rate, means temporarily connectable to said storage capacitor prior to making a count for obtaining a voltage proportional to the difference between the current corresponding to a given count-rate and the mean current due to background pulses, means for making the charge per background pulse fed to the storage capacitor proportional to said voltage, and means for detecting and indicating when the voltage across the capacitor has changed, in either direction, from said initial voltage to predetermined levels.

References Cited by the Examiner
UNITED STATES PATENTS

| | | | |
|---|---|---|---|
| 2,919,401 | 12/1959 | Cole et al. | 324—78 X |
| 3,048,336 | 8/1962 | Ritzenthaler. | |
| 3,056,047 | 9/1962 | Cooke-Yarborough. | |
| 3,158,758 | 11/1964 | Pearson. | |

ARTHUR GAUSS, *Primary Examiner.*